3,138,627
METHOD OF PREPARING TERTIARY BUTYL
PEROXY ESTERS
James B. Harrison, Eggertsville, and Orville L. Mageli,
Grand Island, N.Y., assignors to Wallace & Tiernan
Inc., Newark, N.J.
No Drawing. Filed July 28, 1961, Ser. No. 127,482
4 Claims. (Cl. 260—453)

This invention relates to an improved method for preparing peroxy esters of the lower saturated aliphatic peracids and particularly to the preparation of the t-butyl peroxy esters of the saturated aliphatic acids containing from 2 to 5 carbon atoms inclusive.

It is known that peroxy esters can be made by the interaction of an acyl halide and a peracid. However, this reaction, in considering the esters of the lower acids, is somewhat hazardous.

It is an object of the present invention to prepare t-butyl peroxy esters of the lower saturated aliphatic acids; that is, those alkanoic acids containing 2 to 5 carbon atoms, in good yield and under conditions where the hazard is reduced.

In accordance with the board procedures of the present invention, the anhydride of the lower saturated aliphatic acid is reacted by contact with t-butylhydroperoxide in the presence of a strong alkali. This reaction is caused to proceed preferably in the presence of the hydroxides of the alkali metals and particularly in the presence of caustic soda or caustic potash in aqueous solution.

In illustrating the reaction between acetic anhydride, for instance, and t-butyl hydroperoxide, to prepare t-butyl peroxyacetate, 1 mol of acetic anhydride is reacted in the presence of aqueous caustic potash and 1 mol of t-butylhydroperoxide. There is produced potassium acetate and t-butyl peroxyacetate. The reaction proceeds in accordance with the following generalized equation of the reaction:

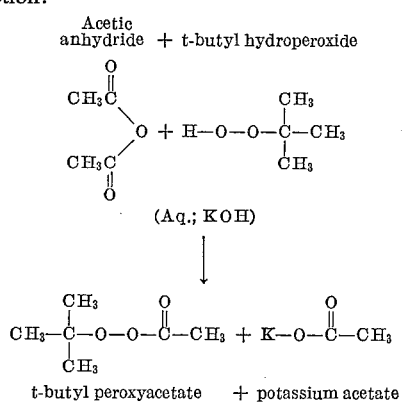

We have found that the reaction proceeds smoothly at room temperature or under cooling, for instance to zero to −5° C. under agitation. The lower the temperature, the better the yield, and yields are improved by carrying out the procedure in an inert solvent, such as benzene or the lower straight chain hydrocarbons, such as pentane through octane, and by the addition, slowly and under stirring, of the hydroperoxide in the caustic to the anhydride.

By carrying out the operation in this fashion, the wanted end product; namely, the t-butylperoxy ester of the 2 to 5 carbon atom, saturated aliphatic acid, tends to be found in solution in the inert solvent whether the same be benzene or aliphatic hydrocarbon. By continuously removing this ester from the reaction environment, yields are increased since the ester is no longer in contact with the strongly hydrolyzing influence of the caustic alkali. By operating in this fashion, yields of upward of 94% to 96% of wanted peroxy ester results. Since the end product is known and desired as a polymerization initiator, particularly in polymerizations involving vinyl monomers, it may be used directly in most of these polymerizations.

The following examples are used to illustrate specifically, the principles of the invention and are not given as limitative of the invention:

Example 1

In the preparation of t-butylperoxyacetate, there is employed 429 parts by weight of acetic anhydride, 120 parts by weight of benzene, 270 parts by weight t-butylhydroperoxide and sufficient 45% caustic potash to provide the alkaline environment for the reaction and to neutralize the acetic acid produced during the reaction. In this instance, 672 parts by weight of aqueous caustic potash (45%) was employed.

The acetic anhydride and benzene are inserted in a flask equipped with a stirrer and thermometer. To this flask cooled to −5° C. is added, slowly, a mixture of the aqueous caustic potash and t-butylhydroperoxide which has been cooled. It is recommended that the reaction proceed under vigorous agitation in order that the resultant peroxy ester be carried into solution in the layer of inert organic solvent and that the yields may be very high and the product of high purity so that it can be employed without further purification.

After several hours and complete addition of the hydroperoxide, agitation is stopped and the reaction mixture permitted to separate into two layers, which separation occurs readily and the upper layer drawn off and, if necessary, dried over magnesium sulfate or any other suitable inert drier. The product is then ready for immediate shipment or use. There was recovered 499 parts by weight of benzene solution which possessed per unit weight, an active oxygen content of 9.1%, as determined in the usual way with iodide and thiosulfate; that is to say, the solution was approximately 75% t-butylperoxyacetate.

Example 2

The same peroxyester can be prepared from the reaction of the acid anhydride and t-butylhydroperoxide, as listed in Example 1, but in the presence of a saturated aliphatic hydrocarbon solvent having a boiling point range up to about 200° C.; that is, those hydrocarbons which might be designated as hexane, heptane, octane and somewhat higher, and mixtures thereof, of from 6 to 12 carbon atoms. The dried solvent layer was about 76% t-butylperoxyacetate and the active oxygen content was 9.2%.

Example 3

In general, the same procedure is followed in the manufacture of t-butylperoxy isobutyrate, as was followed in Example 1. To a cooled reaction vessel equipped with means for agitation, there is placed 80 parts by weight of benzene and 426 parts by weight of isobutyric anhydride. The reaction vessel was cooled to about +5° C. and then there was added, slowly, with stirring and continued cooling, 175 parts by weight of t-butylhydroperoxide and 440 parts of 45% caustic potash. After the addition of the caustic and the hydroperoxide, which may require 30 minutes to an hour or more, the batch is again thoroughly stirred and agitated and the benzene layer then withdrawn and dried over magnesium sulfate. There resulted 360 parts of this layer which corresponded to about 77.8% of t-butylperoxy isobutyrate.

Example 4

In the same manner as outlined in Example 3, the t-butyl peroxyester of pivalic acid may be prepared from pivalic anhydride and t-butylhydroperoxide. However, in this procedure, the yields are not as good as in the preparation of the isobutyrate.

In summary, it will be noted that the temperature should be low during the reaction, the environment such as not to induce hydrolysis of the wanted end product, the peroxy ester, and therefore, large excess of caustic alkali is to be avoided.

In general, a slight excess of the acid anhydride over that required to combine stoichiometrically with the t-butylhydroperoxide, aids in bettering the yields and, during the reaction, it is recommended that the temperature be maintained below 20° C.

In accordance with the present invention, the reaction proceeds smoothly at room temperature or under slight cooling, for instance to zero or −5° C. under agitation. The lower the temperature, in general, the better the yield, and yields are improved by carrying out the procedure in an inert solvent, such as benzene or the lower saturated aliphatic hydrocarbons, such as pentane through octane, and by the addition, slowly and under stirring, of the hydroperoxide in caustic, to the acid anhydride.

By carrying out the operation in this fashion, the wanted end product; namely, the t-butylperoxy ester of the 2 to 55 carbon atoms, saturated aliphatic acid, is found in solution in the inert solvent whether the same be benzene or aliphatic hydrocarbon. By removing this ester continuously from the reaction environment, yields of the wanted product are increased since the ester is no longer in contact with the strongly hydrolyzing influence of the caustic alkali. By operating in this fashion, yields of upward of 94 to 96% of wanted peroxy ester results. Since this product is known and desired as a polymerization initiator, particularly in polymerizations involving vinyl monomers, it may be used directly in most of these polymerizations.

What is claimed is:
1. The process of preparing the tertiary butyl peroxy ester of a lower alkanoic acid of 2 to 5 carbon atoms inclusive, by the reaction of t-butyl hydroperoxide and the anhydride of the alkanoic acid under cooling to a temperature below 20° C., by contact and under vigorous stirring, which comprises slowly adding t-butyl hydroperoxide in an aqueous alkaline solution of an alkali metal to the anhydride of the alkanoic acid carried in an inert organic solvent in which the wanted peroxy ester is soluble, selected from the group consisting of benzene and the alkanes $C_6$ to $C_{12}$ inclusive, the amount of the alkali metal hydroxide being sufficient to provide the alkaline environment for the reaction, and to neutralize the alkanoic acid formed from the anhydride and the amount of the anhydride being in excess of that required to combine with the hydroperoxide added, and separating the wanted peroxy ester from the reaction environment by withdrawing the inert solvent with the peroxy ester therein.

2. Process of claim 1 wherein the alkanoic acid anhydride is acetic anhydride.

3. Process of claim 1 wherein the alkanoic acid anhydride is isobutyric anhydride.

4. Process of claim 1 wherein the alkanoic acid anhydride is pivalic anhydride.

References Cited in the file of this patent

UNITED STATES PATENTS

| | | |
|---|---|---|
| 2,377,038 | Reichert et al. | May 29, 1945 |
| 2,403,709 | Dickey et al. | July 9, 1946 |
| 2,567,615 | Milas | Sept. 11, 1951 |
| 2,608,570 | Harman | Aug. 26, 1952 |
| 2,661,363 | Dickey | Dec. 1, 1953 |

OTHER REFERENCES

Baeyer et al.: Ber. Deut. Chem., vol. 34, pp. 746–747 (1901).